Feb. 18, 1958 C. L. COOPER 2,823,930
RETRACTABLE TRAILER HITCH
Filed Sept. 20, 1954
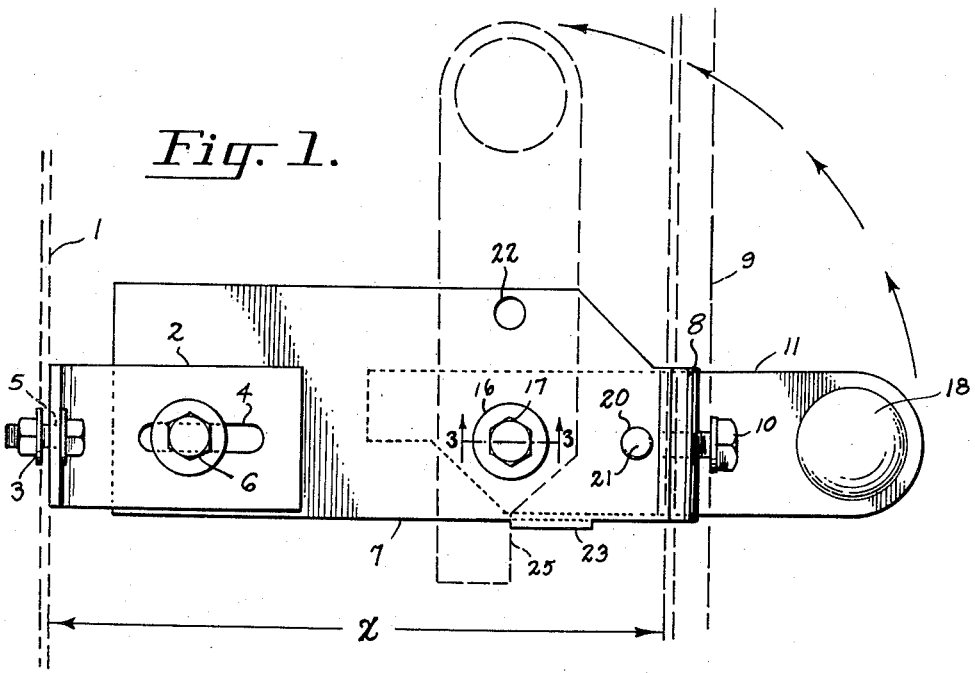
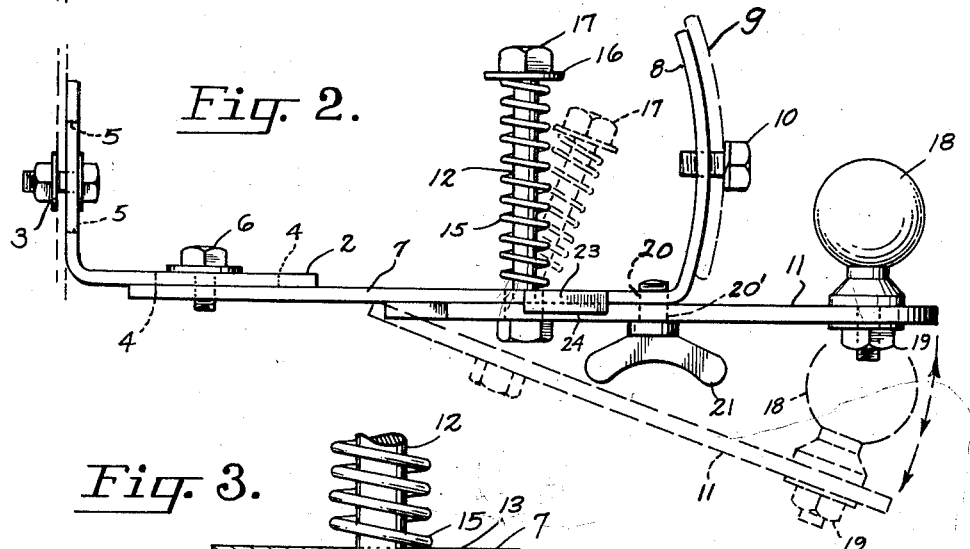
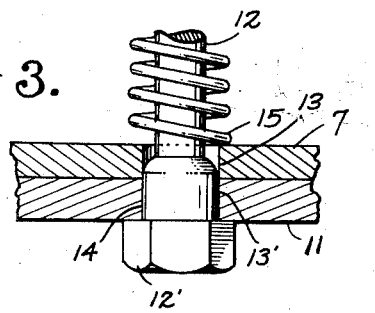
INVENTOR.
Charles L. Cooper

United States Patent Office 2,823,930
Patented Feb. 18, 1958

2,823,930

RETRACTABLE TRAILER HITCH

Charles L. Cooper, Aurora, Oreg.

Application September 20, 1954, Serial No. 457,093

2 Claims. (Cl. 280—491)

This invention relates to a trailer hitch of the type which is fastened to the rear of a vehicle and is adapted to be moved into an operative position and into a stowed position under the vehicle.

Trailer hitches for passenger automobiles have become an increasingly popular accessory. They are practically a necessity for rural automobile owners and, with the widespread sale of camping and living trailer hitches, have come into common use among urban automobile owners.

The commonest type of hitch is one which is rigidly mounted to the rear bumper or frame of the automobile and has a draw bar and attaching ball for the trailer projecting rearwardly from the automobile. When the trailer is detached from the hitch the draw bar and ball project from the automobile and create a dangerous, annoying and unsightly situation. The main danger is to other vehicles because the projection extends beyond the rear bumper and for instance, in parking alongside a curb between two automobiles unless one is careful it is easy to damage the front end of the auto parked in the rear. Also when one wishes to use the trunk of an automobile having a hitch it is in the way and usually the projecting ball is greasy so that it is common for one to soil his clothes when working around the hitch, particularly at night.

While I am familiar with existing hitches of the foldable and swingable type which are adapted to be moved into and out of operative positions from the rear of a vehicle, none of these are completely satisfactory, because of their cost, complexity and difficulty of installation.

The object of my invention is to provide a simple, rugged, and inexpensive trailer hitch which may easily be mounted on a vehicle, particularly a passenger one, and which when not in use may easily be stowed beneath the automobile out of sight and harms way.

I accomplish this object generally by fixing a portion of the hitch between the frame and rear bumper of the automobile. The draw bar and ball of the hitch are detachably and swingably connected to the fixed portion by a spring and bolt arrangement. The draw bar and ball may either be secured in operative position projecting from the rear of the automobile, or swung down under the bumper and stowed beneath the automobile.

The object and features of the invention will be explained in greater detail with reference to the following drawings in which:

Fig. 1 is a top plan view of a hitch according to the invention mounted on a vehicle;

Fig. 2 is a side elevation of the invention on a vehicle, and,

Fig. 3 is a section on lines 3—3 of Fig. 1.

Referring to the drawings, 1 is the usual frame member found under the rear end of most standard passenger vehicles. An L-shaped plate 2 is fastened by a nut and bolt 3 to frame 1. Plate 2 has two longitudinal slots 4 and 5 in each of its angularly disposed portions which permit adjustment of the fastening means to most automobiles. A bolt 6 fastens the other end of the plate 2 to a coupling plate 7 whose other end is upturned into an arcuate portion 8 which conforms and fits against the inside of rear bumper 9 and bolt 10 passing through threaded holes in members 8 and 9 fixes the other end of plate 7. Portion 8 is fastened to the bumper at about its midpoint. It will be noted that the hitch is permanently fastened to the vehicle by only two bolts 3 and 10.

One end of a draw bar 11 is yieldingly fastened to plate 7 by a bolt 12 which passes through holes 13, 13' in plate 7 and bar 11. Bolt 12 may be either tapered from the head 12' to the shank or have a collar 14 which makes for a snug fit with the sides of hole 13' and with a portion of hole 13 in the coupling plate. A coil spring 15 surrounds the shank of the bolt and is positioned between the top surface of plate 7 and a washer 16 held on the bolt by nut 17. Ball 18 is mounted by nut and bolt 19 on the other end of draw bar 11. Between bolt 12 and ball 18 holes 20, 20' in plate 7 and bar 11 register when the draw bar is in its operative position (solid lines Fig. 1) and in alignment with coupling plate 7. The holes are threaded and adapted to receive wing bolt 21 which holds the two parts together. Another hole 22 is provided in plate 7 at 90° to hole 20 and when the draw bar is in stowed position (dotted lines Fig. 1) holes 20' and 22 register and nut 21 is screwed into the two holes and holds the draw bar in this position. Bolt 21 is the sole fastening means employed to hold the bar and coupling plate together in either position of the bar.

A lip 23 depends from the forward side edge of plate 7 and acts as a stop for draw bar 11 in its operative and stowed positions. In operative position lip 23 engages side edge 24 of the bar and in stowed position the lip engages trailing edge 25 of bar 11.

The hitch is mounted on an automobile by fastening plate 2 to the frame of the auto and plate portion 8 to rear bumper 9. In most automobiles there is provided a space X between the frame and rear bumper which will accommodate the hitch in stowed as well as operative positions. When the hitch is in operative position edge 24 of draw bar 11 engages stop 23 and the bar is in alignment with plate 7. Wing bolt 21 is put through holes 20, 20' to secure coupling plate 7 to draw bar 11 and ball is ready to be fastened to a trailer. When it is desired to move the hitch into stowed position, bolt 21 is unscrewed and bar 11 is depressed into the position shown in dotted lines Fig. 2. The shank of bolt 12 is free to tilt in hole 13 and spring 15 is compressed until ball 18 is low enough to be swung underneath bumper 9 in the direction of the arrows Fig. 1, and until edge 25 of the bar engages the rear of stop 23 and hole 20' in bar 11 and hole 22 in plate 7 are in alignment. Bolt 21 is screwed into the holes to complete stowage of the hitch.

When bar 11 is depressed into the position shown in dotted lines in Fig. 2, the bar pivots on a fulcrum established between the inner end of the bar and plate 7. When bar 11 is swung towards a stowed position between the frame and bumper of the vehicle, the pivot point or fulcrum moves outwardly and finally is coincident with the edge of plate 7. Thus when bar 11 is moved into its stowed position, the inner end of the bar strikes lip or stop means 23 irrespective of whether the bar is depressed or in its raised position. This facilitates maximum ease in assembling bar 11 in its stowed position, lip 23 positively limiting forward movement of bar 11 beyond its stowed position in either its raised or depressed position.

It will be noted that the construction at the base of bolt 12 is such that when the bar is in operative position the bolt engages at least a portion of the sides of holes 13, 13' so that the pull from a trailer is applied to the coupling plate and draw bar. When the hitch is being moved into stowed position, the clearance between the sides of the bolt shank and hole 13 permit tilting of the bolt and compression of spring 15 sufficient for ball 18 to be passed underneath the bumper.

While I have shown a preferred embodiment of my invention, changes and alterations will be suggested to those skilled in the art and it is intended to cover all such changes and to limit the scope of the invention only as defined in the appended claims.

I claim:

1. A trailer hitch for attachment to the frame and rear bumper of a vehicle comprising an L-shaped plate having a central longitudinal slot in each of its angularly disposed portions, a first bolt adapted to pass through one of said slots and fasten the plate to the frame, a coupling plate, a second bolt adapted to pass through said other slot and fasten the L plate to one end of the coupling plate, an arcuate portion on the other end of the coupling plate having a hole therein and adapted to conform to the rear bumper of the vehicle and be fastened thereto, a draw bar adapted to be moved into an operative position in alignment with the coupling plate and into a stowed position between the frame and the bumper at about 90° to the coupling plate, a tapered bolt for fastening one end of the draw bar to the coupling plate intermediate the latter's ends, said tapered bolt upstanding from the coupling plate, a coil spring mounted on the upstanding end of the bolt between the coupling plate and the free end of the bolt, a ball mounted on the other end of the draw bar, a depending lip along the forward side edge of the coupling plate adapted to be engaged by the side edges of the draw bar to act as a stop for said bar in its operative and stowed positions, holes in the draw bar and coupling plate adapted to register with each other when the bar is in either of its two positions, and a wing bolt for detachably connecting the bar and coupling plate to one another in either of said positions.

2. The device according to claim 1 and a collar on said tapered bolt whereby there is provided a close fit between the tapered bolt and the sides of the hole in the draw bar and between a portion of the sides of the hole in the coupling plate and the tapered bolt.

References Cited in the file of this patent

UNITED STATES PATENTS

| | | |
|---|---|---|
| 2,174,468 | Kratfel | Sept. 26, 1939 |
| 2,399,810 | Ketcham | May 7, 1946 |
| 2,531,859 | Mock | Nov. 28, 1950 |
| 2,544,185 | Sargent | Mar. 6, 1951 |
| 2,547,299 | Williams | Apr. 3, 1951 |
| 2,576,383 | Avery | Nov. 27, 1951 |
| 2,604,331 | Kingston | July 22, 1952 |
| 2,671,674 | Derksen | Mar. 9, 1954 |
| 2,717,164 | Meyer | Sept. 6, 1955 |
| 2,745,681 | Kitterman | May 15, 1956 |